US011228549B2

(12) United States Patent
Abedini et al.

(10) Patent No.: US 11,228,549 B2
(45) Date of Patent: *Jan. 18, 2022

(54) MOBILE DEVICE SENDING FORMAT TRANSLATION BASED ON MESSAGE RECEIVER'S ENVIRONMENT

(71) Applicant: International Business Machines Corporation, Armonk, NY (US)

(72) Inventors: Mani Abedini, Pascoe Vale (AU); Fang Lu, Billerica, MA (US); Lenin Mehedy, Doncaster East (AU); Shaila Pervin, Docklands (AU)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/488,100

(22) Filed: Apr. 14, 2017

(65) Prior Publication Data
US 2018/0302362 A1 Oct. 18, 2018

(51) Int. Cl.
*H04L 12/58* (2006.01)
*H04L 29/08* (2006.01)
*H04W 4/02* (2018.01)
*H04W 4/12* (2009.01)
*H04W 4/40* (2018.01)

(52) U.S. Cl.
CPC ............ *H04L 51/20* (2013.01); *H04L 51/046* (2013.01); *H04L 67/306* (2013.01); *H04W 4/02* (2013.01); *H04W 4/12* (2013.01); *H04L 51/38* (2013.01); *H04W 4/40* (2018.02)

(58) Field of Classification Search
CPC ....... H04L 51/20; H04L 51/046; H04L 51/38; H04L 67/18; H04L 67/306; H04L 67/10

USPC ......................................................... 709/206
See application file for complete search history.

(56) References Cited

U.S. PATENT DOCUMENTS

| 6,633,315 | B1 | 10/2003 | Sobeski |
| 8,204,273 | B2 | 6/2012 | Chambers |
| 8,416,767 | B2* | 4/2013 | Wang ............... H04M 1/72583 370/352 |
| 8,649,808 | B2* | 2/2014 | Neely ..................... H04W 4/12 455/466 |
| 8,843,101 | B2 | 9/2014 | Fish |
| 8,948,724 | B2 | 2/2015 | Kawasaki |
| 9,104,886 | B1* | 8/2015 | Dolbakian .............. G06F 21/62 |

(Continued)

OTHER PUBLICATIONS

Apple's dynamic user interface would adapt to user's proximity, allowing control from close & far downloaded from http://appleinsider.com/articles/14/02/27/Applesdynamicuserinterfacewouldadapttouse rsproximityallowingcontrolfromclosefar on Jan. 25, 2017. pp. 1-8.

(Continued)

*Primary Examiner* — Esther B. Henderson
*Assistant Examiner* — Nazia Naoreen
(74) *Attorney, Agent, or Firm* — Joseph Petrokaitis; Otterstedt, Wallace & Kammer, LLP

(57) ABSTRACT

At a sending electronic device, from a remote location, an indication is received of an environment at a receiving mobile electronic device to which the sending electronic device is to send a message. It is determined how to send the message from the sending electronic device to the receiving mobile electronic device, based on the indication of the environment at the receiving mobile electronic device. The message is sent from the sending electronic device to the receiving mobile electronic device in accordance with the determining step.

14 Claims, 7 Drawing Sheets

(56) References Cited

U.S. PATENT DOCUMENTS

| | | | |
|---|---|---|---|
| 9,235,711 B1* | 1/2016 | Xavier | G06T 5/003 |
| 9,479,911 B2* | 10/2016 | Kang | H04L 67/2823 |
| 9,516,167 B2 | 12/2016 | Pirat | |
| 9,565,150 B2* | 2/2017 | Baldwin | H04L 51/12 |
| 2010/0280965 A1 | 11/2010 | Vesterinen et al. | |
| 2014/0035823 A1* | 2/2014 | Khoe | G06F 3/02 |
| | | | 345/171 |
| 2014/0052681 A1 | 2/2014 | Nitz | |
| 2014/0256288 A1 | 9/2014 | Allen | |
| 2017/0214651 A1 | 7/2017 | McMichael | |
| 2017/0279759 A1* | 9/2017 | Liden | H04L 12/1822 |

OTHER PUBLICATIONS

Peter Mell and Tim Grance. The NIST Definition of Cloud Computing. Computer Security Division Information Technology Laboratory National Institute of Standards and Technology Gaithersburg, MD 20899-8930 Sep. 2011. pp. 1-7.

Bjorn Buchner, Dynamic user interfaces, Adapting to changing situations in games to increase player performance, GAMASUTRA blog, pp. 1-25, downloaded Apr. 14, 2017 from http://www.gamasutra.com/blogs/BjornBuchner/20140920/226099/Dynamic_user_interfaces_Adapting_to_changing_situations_in_games_to_increase_player_performance.php.

Bihler, P., & Mügge, H. (2007). Supporting Cross-Application Contexts with Dynamic User Interface Fusion. In GI Jahrestagung (1) (pp. 459-464).

Mani Abedini et al., unpublished U.S. Appl. No. 15/859,536, filed Dec. 31, 2017, Mobile Device Input Language Suggestion Based on Message Receiver's Environment, pp. 1-36 plus 7 sheets of drawings.

Paul J. Otterstedt, List of IBM Patents or Patent Applications Treated as Related, Jun. 28, 2018, pp. 1-2.

* cited by examiner

MOBILE DEVICE SENDING FORMAT TRANSLATION BASED ON MESSAGE RECEIVER'S ENVIRONMENT

BACKGROUND

The present invention relates to electronic communication, and more specifically, to mobile communication and text messaging.

Mobile devices are ubiquitous, with a significant portion of communication comprising the sending and receiving of text messages from a sender to a receiver (recipient). However, some types of messages destined for the receiver that may be appropriate in some receiver environments may not be appropriate or desirable in other environments. For example, the intended receiver may be in a public setting so that it would be inappropriate for the sender to send confidential messages that could readily be understood by the general public.

SUMMARY

Principles of the invention provide techniques for mobile device input language suggestion based on a message receiver's environment. In one aspect, an exemplary method includes the step of obtaining, at a sending electronic device, from a remote location, an indication of an environment at a receiving mobile electronic device to which the sending electronic device is to send a message; determining how to send the message from the sending electronic device to the receiving mobile electronic device, based on the indication of the environment at the receiving mobile electronic device; and sending the message from the sending electronic device to the receiving mobile electronic device in accordance with the determining step.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Improvement in the messaging experience between a sender and receiver by providing the sender suggestions as to when a current keyboard language should be changed to another keyboard language to facilitate confidential messaging with the receiver, or if no such keyboard language is available to both the sender and receiver, by suggesting the use of codewords, watchwords, mottos, emoticons, images, sign language, and so forth, that would be understandable to both the sender and the receiver;

Transparently preventing the sender from attaching a video to a message when such video is deemed inappropriate for the contextual environment of the receiver;

Transparently redirecting a message from the sender to a file hosting service or email account so that the receiver may retrieve the message at a later time if the content of the message is deemed to be sensitive or inappropriate for the current contextual environment of the receiver;

Addressing issues of privacy and security arising in the context of mobile communications networks;

Providing additional convenience to the end user when the output device on the message receiver's side can only read out one language. For example, the car reading device can only read one language. If the message was composed in a different language then the car reading device won't be able to read it at all.

These and other features and advantages of the present invention will become apparent from the following detailed description of illustrative embodiments thereof, which is to be read in connection with the accompanying drawings.

DETAILED DESCRIPTION

Figure 1:
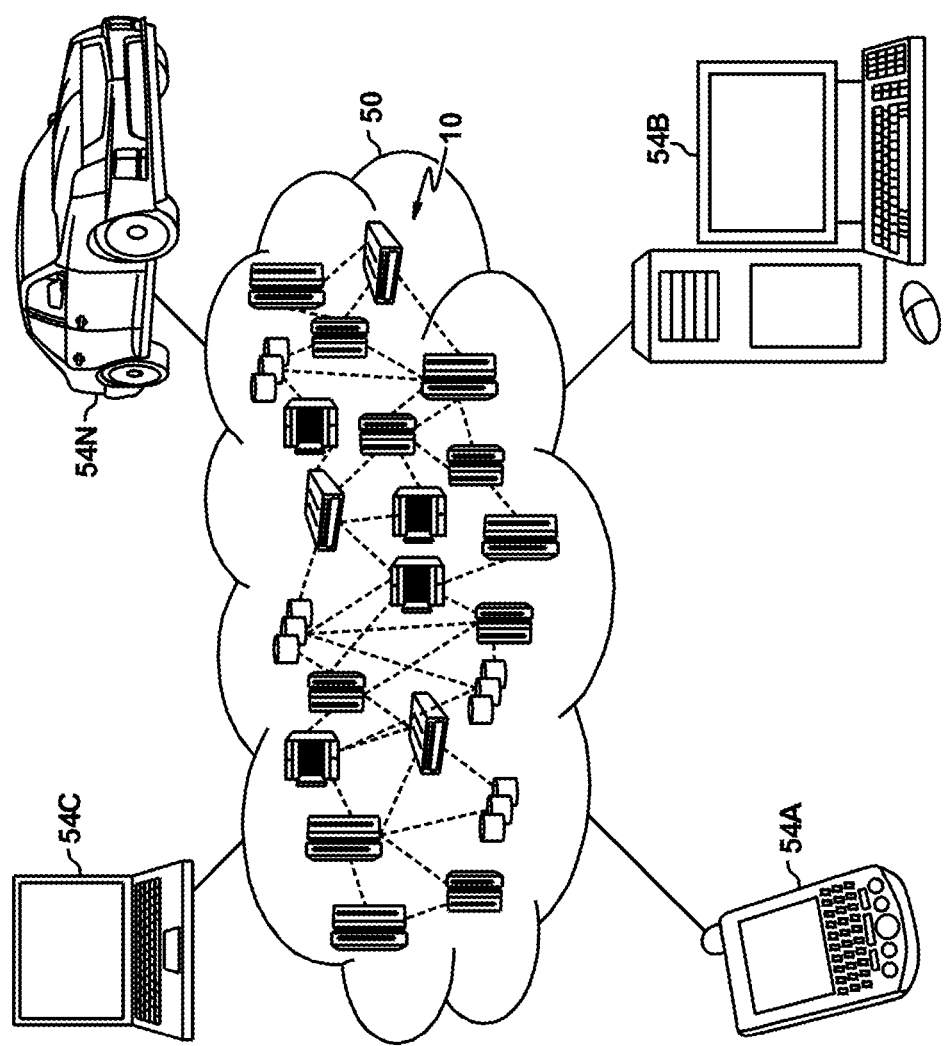
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
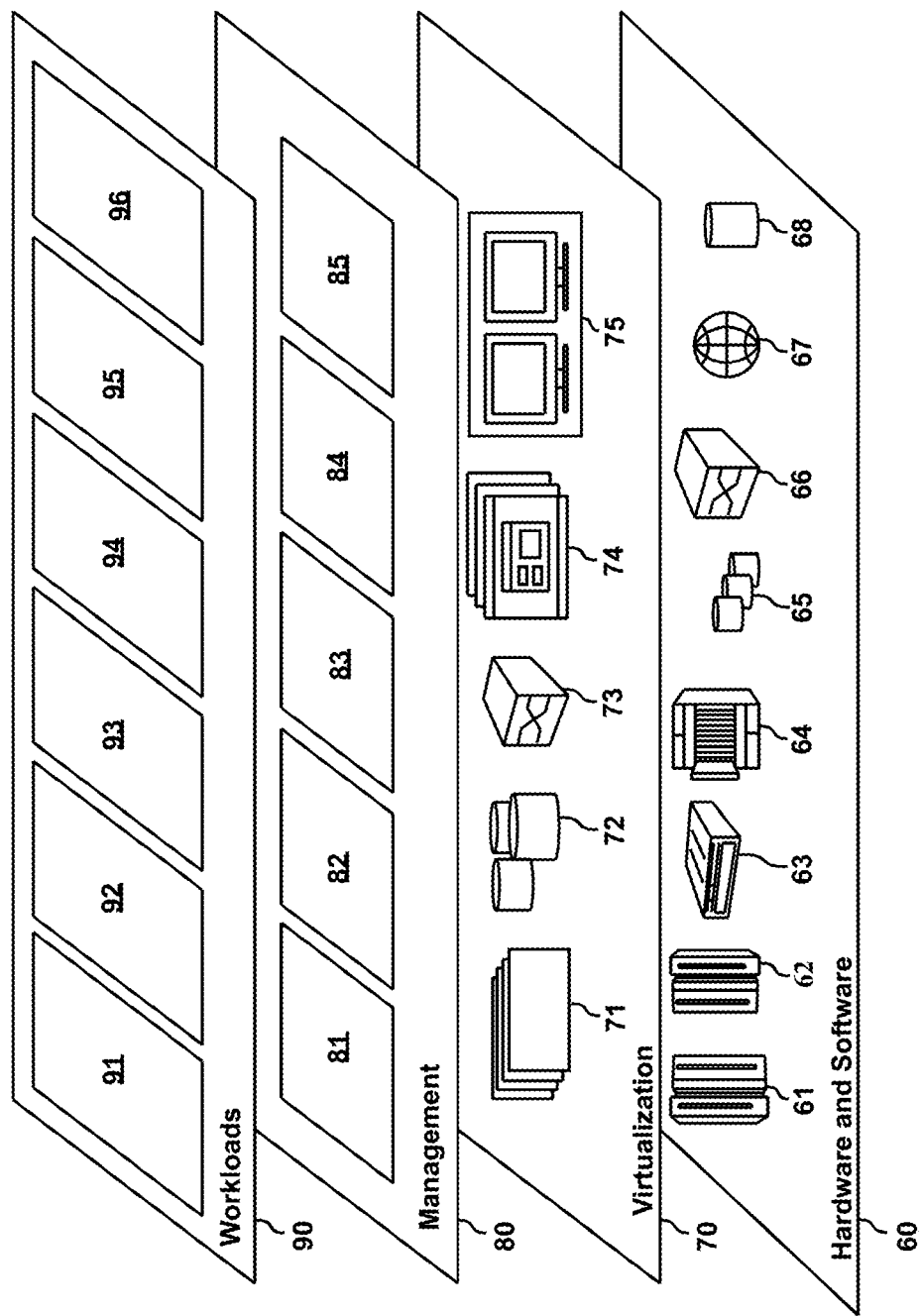
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud service 96 providing registration aspects and/or computationally intensive aspects of a system and method for mobile device input language suggestion based on message receiver's environment.

For a sender that intends to send a message to a receiver (recipient), where the message may include different types of content and format (e.g., text, audio, and video), embodiments provide to the sender various suggestions (recommendations) and/or configure the sender's device to take various actions based upon the contextual environment of the receiver and the capabilities of the receiver's device. The suggestions or actions may include, for example, the particular language that the sender should use when sending the message, or whether video or images should be part of the message. Embodiments may also suggest to the sender various alternative options by which the message may eventually be received by the receiver. For example, where the sender may initially have preferred sending a text message by way of SMS (Short Message Service), embodiments may suggest that the message be sent by way of e-mail or uploaded into a file hosting service so that the receiver may view, watch, or listen to the message at a later time. Alternatively, sensitive content may be sent by the initially selected technique (e.g. text message) but sensitive material may be hidden until the receiver is in a private place.

Figure 3:
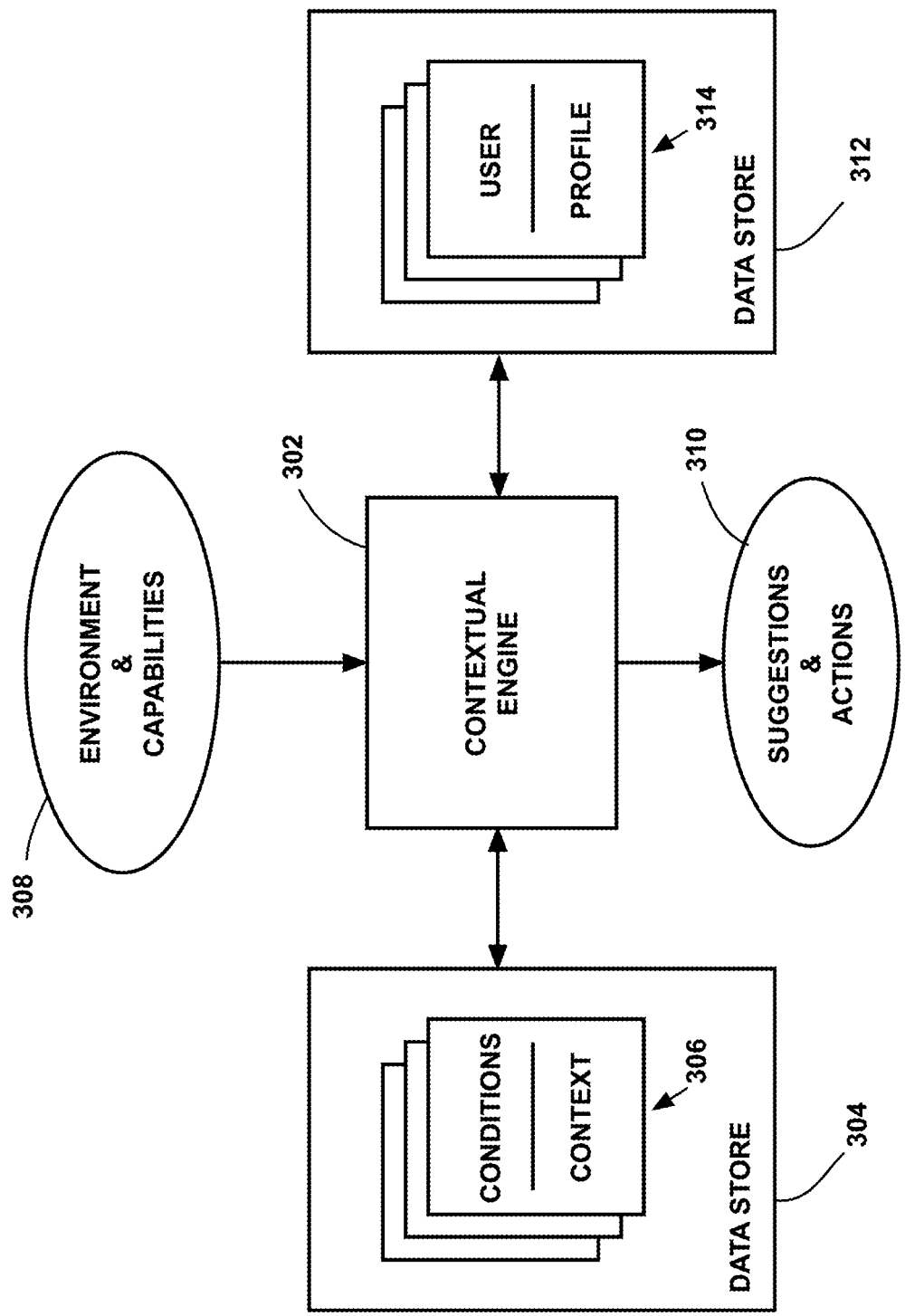
FIG. 3 illustrates a system block diagram implementing one or more processes by which a suggestion or action is determined based upon a contextual environment, according to an embodiment of the present invention.

FIG. 3 illustrates a process by which an embodiment determines a suggestion or action (e.g., suggests an input language to the sender) based upon the context of the environment of the receiver and capabilities of the device used by the receiver. A contextual engine 302 is in communication with a data store 304 in which are stored multiple contexts and their respective conditions, labeled as 306. The contextual engine 302 determines that a context is valid if appropriate conditions associated with that context are satisfied. For some set of conditions, the contextual engine 302 may determine that more than one context is valid. The set of conditions is based upon input provided by the receiver to the contextual engine 302, and for purposes of illustration this input is provided by a module labeled environment and capabilities 308. For a given set of conditions provided by the environment and capabilities 308, the contextual engine 302 may determine that no context is valid, only one context is valid, or multiple contexts are valid. Based upon determining which contexts are valid, the contextual engine 302 outputs results so that an embodiment may generate any one of a number of suggestions or actions, as represented by a module labeled suggestions and actions 310.

It will be appreciated that FIG. 3 depicts the context-determination process in general terms. Given the teachings herein, many different techniques can be employed for context determination. For example, a recipient's device could include an accelerometer or magnetometer to determine a user state. More broadly, non-limiting examples of sensors and the like that may be on or in communication with the recipient's device include inertial sensors (e.g., motion, angle, and/or rotation sensors, such as accelerometers, inclinometers, and the like), proximity sensors, wireless transceivers, Global Positioning System (GPS) transceivers, optical sensors (e.g., scanners, cameras, and the like), light sensors (including visible or non-visible forms of light, e.g., infrared and ultraviolet radiation), tactile sensors, force sensors, pressure sensors, radio frequency transmitters and/or receivers, antennas, audio sensors (e.g., microphones), inductive transceivers, temperature sensors, biometric sensors (e.g., fingerprint scanners or other devices that can recognize voice, iris and/or other facial features or other human biological traits), biosensors, compasses, and/or others.

Again, one or more embodiments can utilize different types of sensor-based devices to detect the user's current environment and/or other users. For example, one or more embodiments use Bluetooth beacon, WiFi AccessPoint IDs, proximity sensors, and the like. Some embodiments can utilize devices such as GPS to detect whether the user is driving or parked (e.g. the speed is 62 miles/hour (100 kilometers per hour) vs. 0 miles/hour (0 kilometers per hour)).

In some cases, the system can switch the message to be sent to different devices upon receiving the message so private or confidential information is not disclosed. For example, SMS can be forwarded to email, drop box, etc. if the user's environment is not appropriate to read the SMS aloud.

In some embodiments, the system can change the security level on the message receiver's device upon receiving the message to protect private and confidential information.

In some cases, upon deciding the security level, the system may automatically encrypt the message and send encryption key (i.e. password) to the receiver's email (or other pre-agreed location) so that the sender may decrypt the message when it is convenient.

Again regarding contextual engine 302, in some cases, a context may be deemed to be present when input provided by the environment and capabilities module 308 matches stored conditions 306 exactly. In other cases, a context may be deemed to be present when input provided by the environment and capabilities module 308 does not match stored conditions 306 exactly; for example, the match may merely be required to exceed a threshold; or fuzzy logic may be employed. In another aspect, pattern recognition can be employed. For example, sensors such as accelerometers could be trained on a training corpus of known accelerometer data from driving, walking, and riding in a commuter train, and then unknown accelerometer data could be compared to a model based on the training, to determine if the recipient was likely driving, walking, or riding in a commuter train.

The input (set of conditions) that the environment and capabilities 308 provides to a receiver may include, for example: whether the receiver is coupled via Bluetooth® to an audio device; the speed at which the receiver is moving; the presence of nearby WiFi® networks; the receiver's location; available keyboard languages; calendar information; image and video data captured by the receiver's camera; image data captured by other optical devices to indicate proximity of the receiver to the receiver's device; and audio picked up by the receiver's microphone. (Bluetooth is a registered trademark, owned by the Bluetooth SIG (Special Interest Group). WiFi is a registered trademark, owned by the Wi-Fi Alliance Corporation.) The contextual engine 302 processes input to generate conditions, whereby the contextual engine 302 queries the data store 304 to determine which contexts are valid and/or performs more sophisticated techniques such as pattern recognition as described elsewhere. Computationally intensive functions may be performed by a cloud-based service, in some cases.

The set of conditions that the contextual engine 302 determines may include, for example, whether the receiver is in a public location, in a moving vehicle, using an external audio device, or in a meeting. The set of conditions may further include the language or languages being spoken nearby the receiver.

Some conditions are simply the raw input received by the contextual engine 302, so that in such cases the contextual engine 302 performs very little or essentially no processing to determine such conditions. For example, the indication of whether the receiver is coupled to a Bluetooth device may include a data packet (e.g., a protocol data unit PDU) sent by the receiver's device to the contextual engine 302, so that processing is not needed other than to extract the content from the data packet that is relevant to Bluetooth operation.

To determine whether some conditions are present, the contextual engine 302 may perform a substantial amount of processing on some of the input provided by the environment and capabilities 308. For example, the contextual engine 302 may perform a substantial amount of processing on audio detected by the receiver's device microphone to determine the particular language or languages spoken by others in close proximity to the receiver. Similarly, the contextual engine 302 may perform significant processing on image data collected by the receiver's device camera to determine whether there are other people in close proximity to the receiver.

Based upon a context or contexts, an embodiment may cause one or more actions to take place. Such examples include: suggesting or recommending that the sender input text using a language that the receiver's device is capable of reading; suggesting or recommending that the sender send text using a language most likely not understandable by other people in close proximity to the receiver; and suggesting or recommending that the sender use simple watchwords or mottos that are understandable to the receiver. Here, a suggestion or recommendation is a message sent to the sender where the message content suggests or recommends that the sender implement one or more actions.

As an example of suggesting or recommending to the sender that a particular language should be used, suppose the contextual engine 302 determines a context indicative of the receiver being surrounded by a number of people, where the receiver is in a geographical location in which there is one predominant language spoken and the receiver currently is using a keyboard associated with that one predominant language. An embodiment may determine what particular keyboards are installed on the sender's device and the receiver's device. This information may be stored in profiles associated with the sender and receiver, or queries may be sent to the sender's and receiver's device to obtain the information. If multiple keyboards have been installed on the devices, then an embodiment may compare whether there is a commonly installed keyboard language different from the keyboard language presently used on the receiver's device. If there is such a commonly installed keyboard language, then an embodiment may send a message to the sender with a suggestion to use that particular keyboard language so that the communication can be kept private. If there is more than one commonly installed keyboard language, then a profile associated with the receiver may indicate a favored language, in which case the particular keyboard associated with the favored language is the one suggested to the sender.

One or more profiles may also include preferences as to whether a sender or receiver desires a message or communication to be private in the first place, and under what circumstances such privacy is desired. As examples, a profile may indicate that the sender or receiver prefers that all communication be kept confidential, or that communication need only be kept confidential if the receiver is in a meeting, or only if the receiver is in public.

If an embodiment determines that the only keyboard language common to both the sender's device and the receiver's device is the one for which the language is easily understood by other people in the receiver's location, and assuming that privacy is desired on the part of the sender or receiver, then the embodiment may make a suggestion to the sender to use simple watchwords or mottos understandable by the receiver. Continuing with this example, the sender may be presented with a set of codewords, emoticons, images, sign language, and so forth, that have been previously detected or used by the sender and the receiver. However, the sender may choose to switch to a keyboard manually if so needed. If no such codewords, etc., have been found by an embodiment, the sender may be prompted to use a voice call with codewords or a video including special sign language.

Some of the capabilities that the environment and capabilities 308 provides as input to the contextual engine 302 may also include capabilities of auxiliary devices that are in communication with the receiver's device, such as for example a car phone that the receiver's device is synchronized (synced) to. The capabilities may then include those of the car phone, such as for example the languages that are available for text-to-speech translation. As a specific example, suppose the contextual engine 302 determines that the receiver's device is synced with a car phone that can only read text in English, then in one embodiment, the contextual engine 302 prompts the sender with a message to enter text only in English.

Other examples may include actions without necessarily sending a message to the sender. For example, an embodiment may switch the input mechanism of the sender depending on the context or contexts of the receiver. As a specific example, a particular language keyboard may automatically be selected if that language is understandable to the sender and the receiver and can be rendered by the receiver's device. The particular language selected may be a favored language for the receiver, or, it may be selected if privacy is of concern and the selected language is not readily understood by other people in close proximity to the receiver.

In the above example of selecting a language, a profile associated with the receiver may be stored to indicate which language is favored by the receiver, or which languages are understandable to the receiver. For some embodiments, multiple profiles may be saved for the receiver and various senders, so that favored languages of the sender may be saved.

Referring to FIG. 3, the contextual engine 302 is in communication with a data store 312 in which are stored one or more profiles 314. A particular profile is indexed by its associated user, where a user may be a possible sender or the receiver. The profile includes information, such as for example preferred languages, perhaps ranked according to desirability. The profile information may be entered by the receiver or sender over time in response to various prompts, or it may be entered during a registration process initiated by the receiver.

As another example in which an embodiment may switch the input mechanism of the sender depending on the context or contexts of the receiver, the contextual engine 302 may switch off the capability of the sender to attach video content to a message, so that the sender uses only text to communicate. As a specific example, the contextual engine 302 may determine, based upon the receiver's electronic calendar, a context indicative of the receiver being in a business meeting, in which case a video might be inappropriate.

As another example, the contextual engine 302 may classify the content of a message as inappropriate for a business meeting if inadvertently (or intentionally) viewed by other people, or the content of a message may be classified as business confidential so that it should not be displayed on a screen when the receiver is in public. In such examples, the contextual engine 302 may redirect the message to an email address or a file hosting service instead of having the message displayed on the receiver's device, so that the receiver may access the message content at a later time. In such cases, the contextual engine 302 may cause the embodiment to send a message to the receiver with a link to retrieve the message. For some embodiments, the message may be encrypted, and a key for decryption may be send to the receiver by way of text messaging or email. Email addresses or login credentials for a file hosting service may be stored in one or more profiles 314.

As another example, suppose two-way messaging has been occurring in real-time, such as for example text messaging or a video call, and the contextual engine 302 determines a change in the environment, for example where one or more people are now in close proximity to either the sender or receiver. The contextual engine 302 may then suggest a different keyboard language in the case where text messaging has been ongoing, or the contextual engine 302 in the case where a video call has been in progress may disable the video so that the sender and receiver use text messaging.

In another aspect, the message could be in voice or video format (MMA messages). In this case the system detects the receiver current status/location and enables/disables camera/mic. For example if the receiver is in a crowded space (public space) the camera is not enabled, instead the sender can send voice or only text messages.

Figure 4:
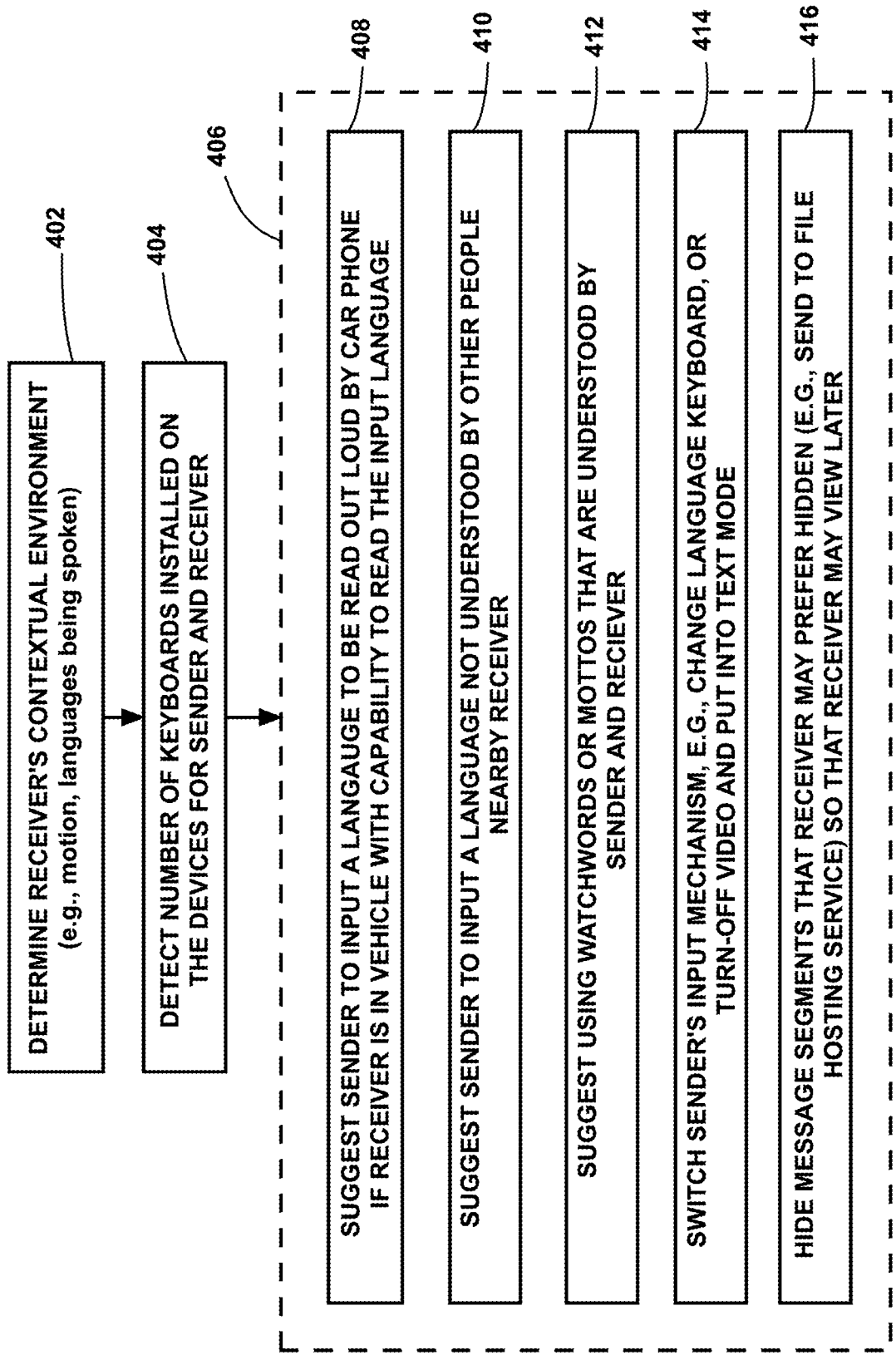
FIG. 4 illustrates some suggestions and actions that may be implemented depending upon contextual environment and capabilities, according to an embodiment of the present invention.

FIG. 4 illustrates some of the suggestions and actions discussed above. Based upon various conditions, the contextual environment of the receiver is determined, 402, and a determination is made of the different types of keyboards (languages) installed on the sender's and receiver's devices, 404. Based upon these determinations, a number of actions or suggestions may follow, depending upon contextual environment and capabilities, as illustrated within the dashed rectangle 406. Several specific suggestions and actions are listed within the dashed rectangle 406.

In 408, the contextual engine 302 suggests to the sender to text with a language for which the car phone has the capability of reading out loud if the contextual environment indicates that the receiver is in a moving vehicle where the receiver's device is synced with the car phone and the car phone has the capability to translate the text to the suggested language.

In 410, if the contextual environment indicates that there are other people nearby the receiver's device, the contextual engine 302 suggests to the sender to text with a language that is not likely understood by the other people.

In 412, if the contextual engine 302 determines that the intended text when displayed in the predominant language would be inappropriate, such as for example a contextual environment in which the receiver is likely in a business meeting or where the content of the text would be inappropriate for the current environment of the receiver, and if other keyboard languages are not available to the receiver and sender, then the contextual engine 302 suggests to the sender to use watchwords or mottos that are understood by both the sender and the receiver.

In 414, the contextual engine 302 causes an embodiment to switch the input mechanism of the sender's device. For example, the contextual environment may indicate that video would be inappropriate, but not text, so that attaching video to a message would be disabled. As another example, the contextual engine 302 may determine a context in which the receiver is in an environment where the content of the text would be inappropriate, but both the sender's device and the receiver's device may have other language keyboards installed, so that the contextual engine 302 causes the sender's device to switch to a commonly installed keyboard having a language not likely understood by others in the current environment. In some cases, some types of videos may be appropriate to send while others may not be. In some instances, the sender's device may make such determination, and/or may communicate with a cloud-based service to make such determination; for example, using suitable video analytics software.

In 416, the contextual engine 302 may determine that the contextual environment indicates that the content of the text should be hidden in some manner so that the receiver may view the text at a later time. As an example, the text may be emailed to a designated email address or sent to a file hosting service, where a message may be sent to the receiver indicating that such an action has taken place. The message may contain a link to retrieve the email or the message from a file hosting service. A decision to hide content could, in some instances, occur in real time. For example, if two-way messaging is happening in real-time, such as text-chat/video-chat, and the system detects sudden presence of other people around either side, it may switch the input mechanism (e.g. language keyboard, turn-off video and go into text mode) automatically and appropriately. In such a scenario, it may also hide previous messages partially or completely in the sudden presence of other people. For example, if it was a text-chat, it would blur or hide previous messages or certain types of images/emoticons on the screen.

In some embodiments, the action taken by the contextual engine 302 may also depend upon input provided by the sender. For example, the sender may manually select that a message is intended to be public or private before sending the message. For the case in which a message is intended to be public, it is acceptable to send such message in a language commonly understood in the recipient's area. In the case in which the message is intended to be private, the message may be translated into a language that is not commonly understood by those in the geographical location of the receiver. Particular languages commonly understood in various geographical locations may be learned over time or provided as input by the sender or the receiver. Alternatively, a database may be accessed that, once the geographical location of the receiver is determined, provides the one or more commonly understood language associated with that geographical location. Furthermore, over time, the system can learn what type of message is considered as a public message and what is a private message based on the content composed.

The embodiments described with respect to FIG. 3 may be viewed as providing a mapping from subsets of conditions to one or more messages or actions. The mapping may vary in time, and may depend upon information stored in the one or more profiles 314. For some given set of conditions, this mapping includes determining one or more contexts whose associated conditions are included in the given set of conditions, and determining the one or more messages or actions based on the one or more contexts. Accordingly, a mapping may be one-to-many, so that multiple suggestions or actions may take place in response to a set of conditions.

One or more of the above described embodiments may be implemented by one or more processes running on the sender's device, the receiver's device, or on a remote server by way of a network, or network of networks, such as the Internet, or any combination thereof. For example, some or all of the processes may run as the workload 96 on the workload layer 90 as discussed with respect to FIG. 2, or some or all of the processes may run on the sender's and receiver's devices as part of an operating system, an application, or some combination thereof. Furthermore, some or all of the conditions that the environment and capabilities 308 provides as input to the contextual engine 302 may be derived from various sensors on the sender's and receiver's communication devices, as described below with respect to FIG. 5.

Figure 5:
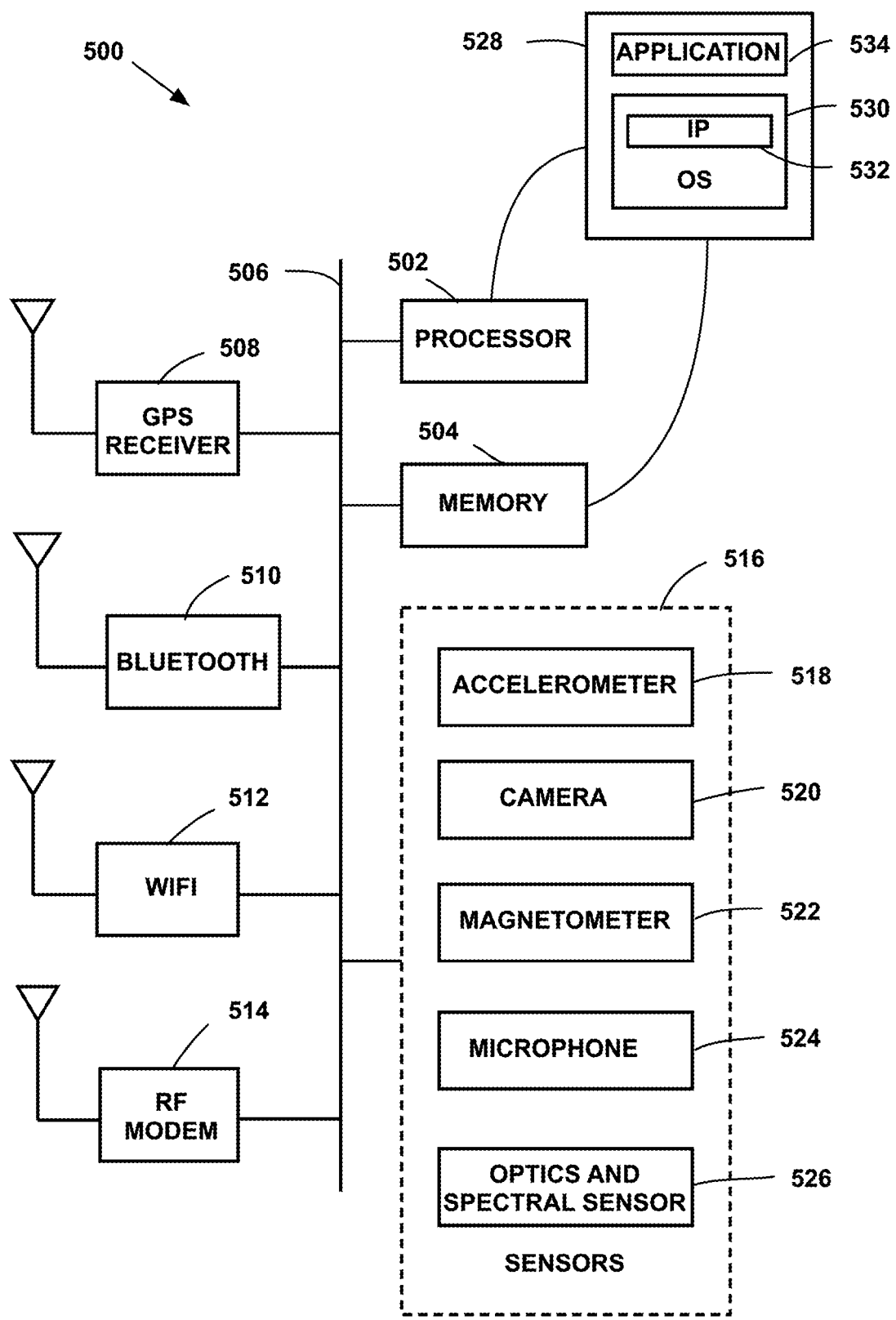
FIG. 5 is an architecture-level diagram of a communication device, such as a cellular phone or smartphone, in which an embodiment may find application.

FIG. 5 is an architecture-level diagram of a communication device, such as a cellular phone or smartphone, in which an embodiment may find application. FIG. 5 illustrates an exemplary communication device 500 (e.g., such as the cellular telephone 54A of FIG. 1) in which embodiments may find application. A programmable processor 502 is in communication with a memory 504 by way of a bus 506. The processor 502 may represent one or more processing cores fabricated on one or more chips. The memory 504 may represent a memory hierarchy including one or more levels of memory. The processor 502 also includes memory, but such memory is not explicitly illustrated in FIG. 5. The communication device 500 further includes several modules coupled to the bus 506: a GPS (Global Positioning System) receiver 508, a Bluetooth transceiver 510, a WiFi transceiver, and an RF (Radio Frequency) modem 514. The WiFi transceiver 512 may be in accordance with any one of several standards, such as for example the IEEE 802.11 standard.

The RF modem 514 may represent one or more RF antenna and modem systems for various types of RF communications, such as cellular phone communication according to the Long Term Evolution (LTE) standard, or near field communication, to name just two examples. The RF antenna may be a MIMO (Multiple-Input and Multiple-Output) antenna, for example.

A suite of sensors 516 includes one or more sensors coupled to the bus 506, where the suite of sensors may include, for example, an accelerometer 518, a camera 520, a magnetometer 522, a microphone 524, and an optics and spectral sensor 526. The optics and spectral sensor 526 may be similar to the camera 520, but fabricated to operate outside of the visible spectrum, or it may be fabricated to operate over one or more narrowband of frequencies to aid in proximity detection or other types of detection, such as facial detection.

During operation of the communication device 500, the device 500 loads software stored in the memory 504 and runs several processes based upon such stored software as well as perhaps firmware stored in the processor 502. In particular, various protocol stacks are implemented so that the communication device 500 can communicate over various networks with other devices, such as other cellular phones, landline phones, and servers.

FIG. 5 illustrates a simplified view of a protocol stack 528 having an operating system 530 in which one of the layers in the operating system 530 is an IP (Internet protocol) layer 532. The operating system 530 includes numerous other software layers, but such layers need not be described in detail here. FIG. 5 illustrates an application layer 534 above the IP layer 532. Data from the application layer 534, which may be termed a service data unit (SDU), is passed down to the IP layer 532 to be encapsulated into a protocol data unit (PDU), for example for example a TCP/IP packet.

The modules 508, 510, 512, and 514, and the sensors illustrated by the suite of sensors 516, provide the data to the environment and capabilities 308 so that a set of conditions for the communication device 500 may be provided as input to the contextual engine 302. For example, whether the communication device 500 is in a moving vehicle may be obtained from the GPS receiver 508, where software running on the protocol stack 528 may determine the average speed, and where the Bluetooth transceiver 510 is synced with a car phone. For example, an average speed above 5 mph when the communication device 500 is synced with a car phone would indicate that the communication device is likely in a moving vehicle.

As another example, image data from the camera 520 and audio signals from the microphone 524 may be analyzed to determine whether people (other than the user) are in the near proximity to the communication device 500. The presence of multiple beacons received by the Wi-Fi transceiver 512 may also be indicative that the receiver is in a public area in which other people may be present.

Processing images from the camera 520 and processing audio signals received by the microphone 524 to determine conditions associated with the contextual environment may overburden the processor 502. Furthermore, it may be beneficial to access a large data repository to help in image and speech detection to determine the contextual environment, where such a large data repository would exceed the capacity of the memory 504. Accordingly, it may be desirable for some or all of the processing described with respect to the embodiments to be performed on a remote server where a large data repository may be accessed, such as a service provided in a cloud computing environment by way of APIs (Application Programming Interface), such as the workload 96 of FIG. 1. The IP layer 530 facilitates communication to a cloud computing environment. Furthermore, the one or more profiles 314 may be stored in the cloud computing environment by way of a registration process initiated by a receiver or sender.

One or more embodiments advantageously provide a system and method which can make intelligent suggestions to the message sender (and/or message sender's device) about input language, content of the input and format of the input (text, or voice or video, or displaying partial content)

by detecting the message receiver's current environment which includes, for example, the audio reading device the message will be read from if the user has to be hands free focusing on driving; whether the user is surrounded by a crowd and the messages (including text, voice and video) might be seen by other people. As a result, in an embodiment, the system can suggest or change the input method or output content in one, some, or all of the following ways:

The system can suggest that the user input the text using a language the receiver's device can read.

The system can recommend the message sender to send the message using a language which most likely won't be understood by the crowd around the message receiver.

The system can recommend the message sender to send messages using some simple watchwords or mottos that will be understood by the message receiver but likely not those around the message receiver.

The system can switch the input mechanism (e.g. language keyboard, turn-off video and go into text mode) automatically and appropriately.

The system can analyze the content and hide the segments that the receiver may prefer to be hidden, and listen/watch in more private setting space later.

One or more embodiments benefit users from both security and ease of use perspectives.

Again, many techniques can be used to determine context, given the teachings herein. For example, GPS in the recipient's car or smart phone can be used. In another aspect, suppose the recipient is at a conference. Cameras, RFID readers, or other devices (e.g. at the conference check-in booth) may be available to send into a cloud-based central repository in association with the recipient. RFID readers can also be used to determine whether the message recipient is currently in a crowded area (e.g., trade show, conference, shopping mall).

Some embodiments use pattern recognition from GPS and/or accelerometer data or the like to detect different patterns; e.g., riding on a train, riding in a bus, walking, driving in a car, and so on. For example, a train passenger may be able to concentrate more than a driver, but is likely in a less secure place as compared to the car driver who needs to pay more attention but is likely in a more secure place. Pattern recognition can be used to estimate where the receiver is and how many people are around the receiver. For example, a steady speed of about 62 miles per hour/100 kilometers per hour may indicate that the user is driving a car; faster may indicate a train faster; much slower may indicate bicycling or walking. An acceleration pattern could be recognized.

In another aspect, the type and amount of background noise are used to estimate whether others are present in the vicinity of the recipient.

In some instances, at least a portion of the software functionality is provided at the level of the sender's mobile phone's operating system (OS). One or more embodiments detect what keyboard/input languages the message sender has installed on his or her mobile device. The location and surrounding environment of the message receiver are estimated, and that information is sent back to the message sender. A system in accordance with aspects of the invention can then suggest that the sender send the message in a different language or at a high level with limited disclosure of confidential information. In one or more embodiments, modification to existing cellular telephone networks and/or involvement of mobile telephony providers are not necessary. Again, one or more embodiments utilize the ability to detect where the message receiver is located and what the surrounding environment is; this information is sent back to the message sender so that a determination can be made at the OS level whether to switch the input language from one language to another so that when the message is sent to the receiver, eavesdroppers cannot understand the message. In another aspect, suppose the recipient's car can only read text messages out in English; this information comes back to the sender's phone which prompts the sender to use English.

In one or more embodiments, at least a portion of the software functionality resides on the recipient's device, to determine the location and surrounding environment. For example, the sender wants to make a voice call or send a text message to the recipient. That signal is sent through the cellular network. The recipient's phone is about to ring; functionality on the recipient's phone detects the location and surrounding environment (or sends data to the cloud and/or the sender's phone so that the cloud and/or sender's phone can determine those things).

Some embodiments employ an application executing on a smart phone, in addition to or in lieu of additional functionality at the OS level. For example, the sender and recipient may each download an app which has access to the OS level of the smart phone so as to be aware of keyboard settings, Caller ID, and so on, without requiring modification to the OS per se. Where an app is used, the user may have the option of manually starting it, or the app can run in the background and monitor the message sending process. In one or more embodiments, people register their phones and give permission to the app that is installed on the phone, in a privacy-compliant manner.

In some embodiments, there is an intermediary such as a cloud service where the required information is piggybacked—the data from the receiver side is pushed back to the sender's side so the sender-side app can make a decision. Furthermore, computationally-intensive analytics (e.g. video or voice analysis, acoustic processing, language detection, detection of number of people nearby from background noise, etc.) could utilize cloud services. One or more embodiments employ an application programming interface (API) call to a cloud service. The API can provide, for example, authentication, access control, and privacy, handled by a registration process.

In one or more embodiments, the data that comes from the recipient's phone to the sender's phone and/or to the cloud, to help the sender determine how to send the message, is transmitted via a wireless data connection and not a voice channel.

Figure 6:
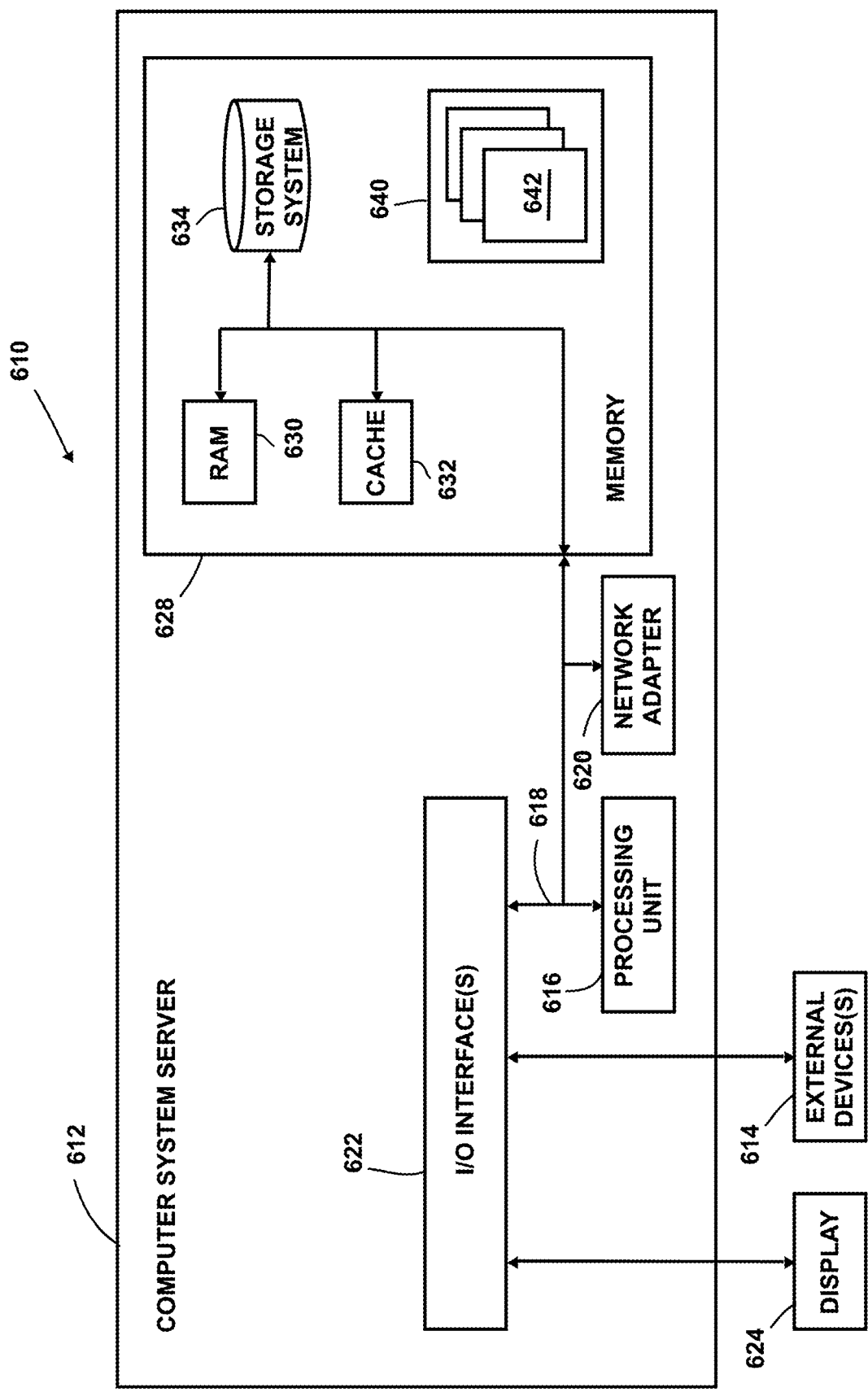
FIG. 6 depicts a computer system that may be useful in implementing one or more aspects and/or elements of the invention, also representative of a cloud computing node according to an embodiment of the present invention.
Figure 7:
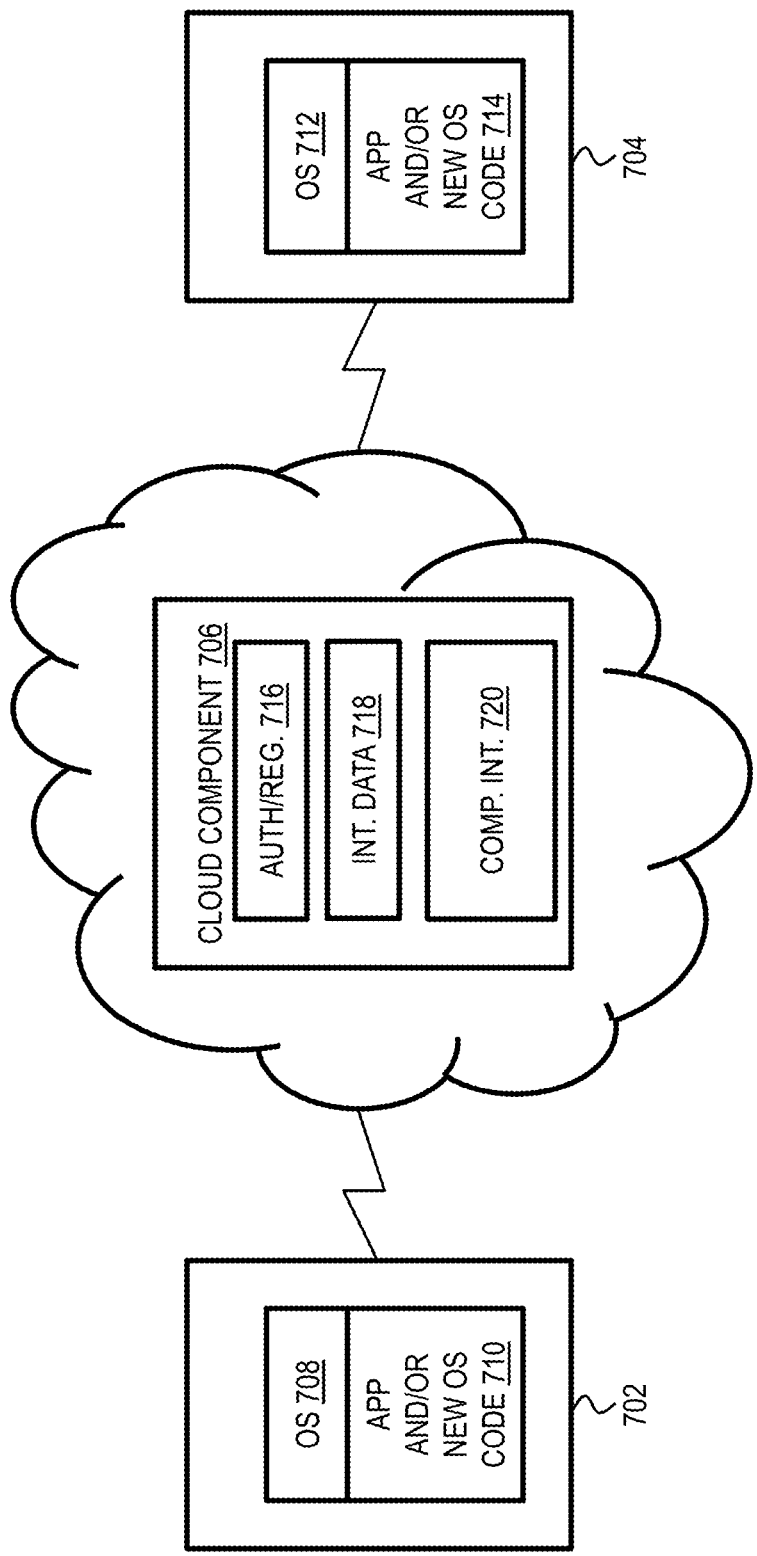
FIG. 7 shows another system block diagram, according to an embodiment of the present invention.

Given the discussion thus far, and referring also to FIG. 7, it will be appreciated that, in general terms, an exemplary method, according to an aspect of the invention, includes the step of obtaining, at a sending electronic device 702 (e.g., smart phone, tablet or the like as shown in FIG. 5 or general purpose computer as shown in FIG. 6), from a remote location, an indication of an environment at a receiving mobile electronic device 704 (e.g., smart phone, tablet or the like as shown in FIG. 5) to which the sending electronic device is to send a message. The context or environment at the device 704 may be determined as set forth herein; e.g., via accelerometers or other sensors, GPS, camera and/or microphone providing audio or video of the surroundings on or proximate to and in communication with device 704. Processing of data from such sources may be carried out on device 704 using, as shown at 714, an app executing under OS 712 and/or new functionality coded into OS 712. In addition or alternatively, computationally intensive aspects of such processing may be carried out in a cloud-based component 706 as seen at 720.

A further step includes determining how to send the message from the sending electronic device to the receiving mobile electronic device, based on the indication of the environment at the receiving mobile electronic device. This may be carried out, for example, on device 702 using, as shown at 710, an app executing under OS 708 and/or new functionality coded into OS 708, to implement the logic described herein. In addition or alternatively, computationally intensive aspects of such processing may be carried out in the cloud-based component 706 as seen at 720.

An even further step includes sending the message from the sending electronic device to the receiving mobile electronic device in accordance with the determining step. Communication between devices 702, 704 may be carried out, for example, via a wireless (e.g. cellular) voice and data network, which may also include wired or land-line components. As noted elsewhere, other cloud-based aspects may include an authentication or registration component 716 which may store user preferences, as well as intermediary functionality such as a cloud service where the required information is piggybacked—the data from the receiver side is pushed back to the sender's side so the sender-side app can make a decision, as indicated at 718.

In a non-limiting example, the indication of the environment at the receiving mobile electronic device includes an indication that the receiving mobile electronic device is in a crowded area. The sending may, for example, then include sending the message in a sending language different from one or more languages commonly understood at a location of the receiving mobile electronic device. To implement this approach, at least some embodiments determine the location of the receiving mobile electronic device (e.g. on device 704 or in cloud component 706); and then determine the one or more languages commonly understood at the location of the receiving mobile electronic device, based on the location of the receiving mobile electronic device (e.g. on device 702 or in cloud component 706).

In some cases, a further step includes determining that the sending electronic device and the receiving mobile electronic device are capable of communicating in a language other than the one or more languages commonly understood at the location of the receiving mobile electronic device (e.g. more than one keyboard in step 404 and at least one keyboard not commonly understood). The sending of the message in the sending language is responsive to the determining that the sending electronic device and the receiving mobile electronic device are indeed capable of such communication.

Some embodiments prompt a user (e.g. via 710) of the sending electronic device to send the message in the language other than the one or more languages commonly understood at the location of the receiving mobile electronic device.

In some cases, the indication of the environment at the receiving mobile electronic device includes an indication that the receiving mobile electronic device is in a crowded area; and the sending includes sending the message via at least one of codewords, watchwords, mottos, emoticons, images, and sign language.

In at least some such cases, further steps include determining a location of the receiving mobile electronic device; determining one or more languages commonly understood at the location of the receiving mobile electronic device, based on the location of the receiving mobile electronic device; and determining that the sending electronic device and the receiving mobile electronic device are incapable of communicating in a language other than the one or more languages commonly understood at the location of the receiving mobile electronic device. The sending of the message via the at least one of codewords, watchwords, mottos, emoticons, images, and sign language is then responsive to the determining that the sending electronic device and the receiving mobile electronic device are incapable of such communication.

In one or more embodiments, the indication of the environment at the receiving mobile electronic device includes an indication that the receiving mobile electronic device is in a crowded area; and the sending includes redacting the message to remove private content prior to sending the message. Optionally, redacted portions can be redirected to an email address or file hosting service for later retrieval, without the receiver device implementing text-to-speech conversion on the message.

In some cases, a further step includes carrying out machine learning on a corpus of labeled messages and subsequently automatically tagging the private content.

In another aspect, in some embodiments, the indication of the environment at the receiving mobile electronic device indicates a change from a private environment to a crowded environment during real-time messaging between the sending electronic device and the receiving mobile electronic device. The determining of how to send the message from the sending electronic device to the receiving mobile electronic device includes determining that the messaging should be switched from audiovisual to text mode; and the sending of the message is changed from audiovisual to text.

In yet another aspect, the indication of the environment at the receiving mobile electronic device includes an indication that the receiving mobile electronic device is in an automobile being driven by a user of the receiving mobile electronic device. The automobile has a capability to provide speech synthesis of text messages in a first language, and the sending includes sending the message as a text message in the first language. A sender who uses the sending electronic device may be prompted to send the text message in the first language.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 616, a memory 628, and an input/output interface 622 to a display 624 and external device(s) 614 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 630, ROM (read only memory), a fixed memory device (for example, hard drive 634), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 616, memory 628, and input/output interface 622 can be interconnected, for example, via bus 618 as part of a data processing unit 612. Suitable interconnections, for example via bus 618, can also be provided to a network interface 620, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 616 coupled directly or indirectly to memory elements 628 through a system bus 618. The memory elements can include local memory employed during actual implementation of the program code, bulk storage, and cache memories 632 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 620 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a workload 96 performing some or all of the processes for the described embodiments, where the hardware components described in FIG. 6 reside in the hardware and software layer 60 but are virtualized in the virtualization layer 70.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 616. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer readable medium comprising computer executable instructions which when executed by a processor of a sending mobile electronic device cause the processor to perform the method of:

obtaining, at the sending mobile electronic device, from a receiving mobile electronic device to which the sending mobile electronic device is to send a first message, an indication of the environment at the receiving mobile electronic device;

deciding, by the sending mobile electronic device, to redirect the first message from the sending mobile electronic device to at least one of an e-mail address and a file hosting service, instead of to the receiving mobile electronic device, in response to the indication of the environment at the receiving mobile electronic device;

preserving privacy of the first message by the sending mobile electronic device redirecting the first message to the at least one of the e-mail address and the file hosting service upon deciding to redirect the first message; and sending, from the sending mobile electronic device to the receiving mobile electronic device, in response to redirecting the first message, a second message with a link to retrieve the first message from the at least one of the e-mail address and the file hosting service.

2. The computer readable medium of claim 1, wherein the method further comprises delaying the sending of the second message to a later time, wherein the delayed sending is responsive to obtaining, at the sending mobile electronic device, a change in the indication of the environment at the receiving mobile electronic device.

3. The computer readable medium of claim 1, wherein the indication of the environment at the receiving mobile electronic device comprises a first indication that the receiving mobile electronic device is in a public space and a second indication of a location of the receiving mobile electronic device, wherein the first indication is obtained from GPS or from a proximity sensor and the second indication is obtained from GPS or WiFi scanning.

4. The computer readable medium of claim 1, further comprising:

obtaining at the sending mobile electronic device, from the receiving mobile electronic device, an indication of one or more environments in which message privacy is requested;

wherein deciding to redirect the first message is done in response to the indication of the environment at the receiving mobile electronic device matching one of the one or more environments in which message privacy is requested.

5. The computer readable medium of claim 1, wherein the indication of the environment at the receiving mobile electronic device includes an indication of a language being spoken by people in proximity to the receiving mobile electronic device;

wherein deciding to redirect the first message is in response to a language of the first message matching the language being spoken by people in proximity to the receiving mobile electronic device.

6. The computer readable medium of claim 5, wherein the indication of the language being spoken by people in proximity to the receiving mobile electronic device is obtained from a geographical location of the receiving mobile electronic device and the language of the first message is obtained from a selected keyboard of the sending mobile electronic device.

7. The computer readable medium of claim 5, wherein the indication of the language being spoken by people in proximity to the receiving mobile electronic device is obtained from analysis of speech detected by the receiving mobile electronic device.

8. A sending mobile electronic device comprising:
a memory; and
at least one processor, coupled to the memory, and operative to:
obtain, at the sending mobile electronic device, from a remote location, an indication of an environment at a receiving mobile electronic device to which the sending mobile electronic device is to send a first message;
decide to redirect the first message from the sending mobile electronic device to at least one of an e-mail address and a file hosting service, instead of to the receiving mobile electronic device, in response to the indication of the environment at the receiving mobile electronic device;
preserve privacy of the first message by redirecting the first message to the at least one of the e-mail address and the file hosting service upon deciding to redirect the first message; and
send, from the sending mobile electronic device to the receiving mobile electronic device, in response to redirecting the first message, a second message with a link to retrieve the first message from the at least one of the e-mail address and the file hosting service.

9. The sending mobile electronic device of claim 8, wherein the processor is further operative to delay sending the second message until a later time, wherein the delayed sending is responsive to obtaining, at the sending mobile electronic device, a change in the indication of the environment at the receiving mobile electronic device.

10. The sending mobile electronic device of claim 8, wherein the indication of the environment at the receiving mobile electronic device comprises a first indication that the receiving mobile electronic device is in a public space and a second indication of a location of the receiving mobile electronic device, wherein the first indication is obtained from GPS or from a proximity sensor and the second indication is obtained from GPS or WiFi scanning.

11. The sending mobile electronic device of claim 8, wherein the processor is further operative to obtain, from the receiving mobile electronic device, an indication of one or more environments in which message privacy is requested;
wherein deciding to redirect the first message is done in response to the indication of the environment at the receiving mobile electronic device matching one of the one or more environments in which message privacy is requested.

12. The sending mobile electronic device of claim 8, wherein the indication of the environment at the receiving mobile electronic device includes an indication of a language being spoken by people in proximity to the receiving mobile electronic device;
wherein deciding to redirect the first message is in response to a language of the first message matching the language being spoken by people in proximity to the receiving mobile electronic device.

13. The sending mobile electronic device of claim 12, wherein the indication of the language being spoken by people in proximity to the receiving mobile electronic device is obtained from a geographical location of the receiving mobile electronic device and the language of the first message is obtained from a selected keyboard of the sending mobile electronic device.

14. The sending mobile electronic device of claim 12, wherein the indication of the language being spoken by people in proximity to the receiving mobile electronic device is obtained from analysis of speech detected by the receiving mobile electronic device.

* * * * *